May 20, 1924.
D. SINCLAIR
PEDAL PAD
Filed March 27, 1923
1,494,983
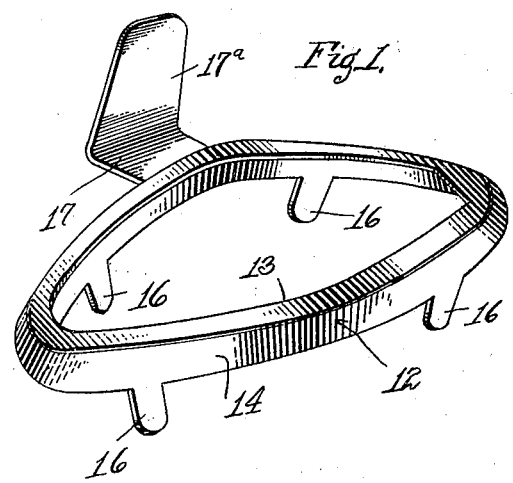
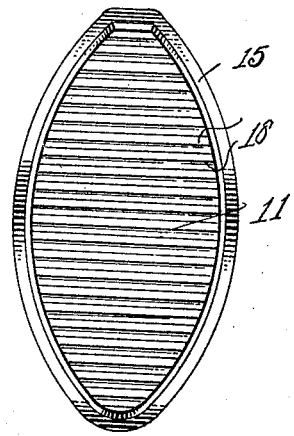
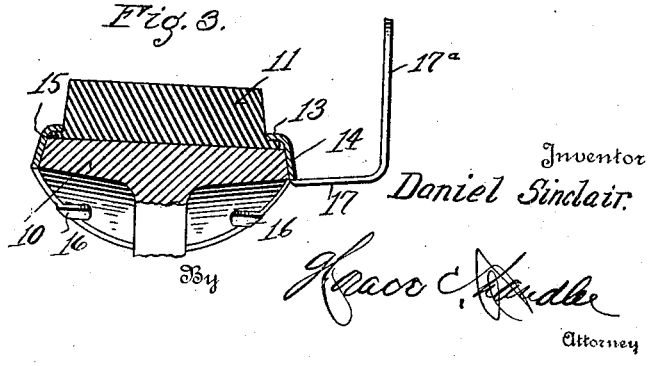
Inventor
Daniel Sinclair.
By
Attorney Patented May 20, 1924.

1,494,983

UNITED STATES PATENT OFFICE.

DANIEL SINCLAIR, OF NEW YORK, N. Y.

PEDAL PAD.

Application filed March 27, 1923. Serial No. 628,120.

*To all whom it may concern:*

Be it known that I, DANIEL SINCLAIR, a citizen of the United States, residing at New York, in the county of New York, State of New York, have invented certain new and useful Improvements in Pedal Pads; and I do hereby declare the following to be a full, clear, and exact description of the invention, such as will enable others skilled in the art to which it appertains to make and use the same.

The object in view is to provide an attachable pedal pad suitable for use on automobile and similar foot levers and especially designed for Ford auto pedals, as a means of affording a secure and comfortable bearing of the foot thereon, with provision against lateral slipping or displacement, a guide for the proper positioning of the foot thereon, and a simple means for locating the pedal by the foot without requiring the special attention of the driver; and furthermore, it is an object to provide a pad having a cushion holding frame which, while having the requisite strength and stability, shall be capable of production by stamping from sheet metal and shall include all of the means necessary for holding the cushion and for secure engagement with the pedal, and in addition shall embody the foot positioning guard and "finder" to facilitate locating the pedal.

These objects, and others of like importance, are carried out in the construction of which a typical embodiment is shown in the accompanying drawing, wherein:

Figure 1 is a perspective view,

Figure 2 is a plan view of the pad, and

Figure 3 is a sectional view showing the invention in place on a pedal.

The pad is of two-part construction designed for instantaneous manual assembly without the use of tools or securing means, and depending for the permanency of their relation upon their complementary construction, and the illustrated form comprises a holder or frame provided with means for attachment to a vehicle pedal, as shown at 10, and adapted for engagement therewith without modification in the construction of the pedal, and a cushion 11 removably and replaceably seated in the holder or frame and adapted to be permanently locked in position by the pedal when associated therewith. The holder or frame includes a ring 12 of elongated, approximately elliptical form which, cross-sectionally, is curved to provide an inturned lip 13 and a rearwardly directed rim 14 designed to receive the head 10$^a$ of the pedal and embrace the same. The rear face of the ring constitutes a seat for a peripheral flange 15 on the cushion (of rubber or like yielding and frictional material), while the body portion of the cushion projects forwardly through the opening of the ring and beyond the front surface thereof with its side faces engaged by the edge of the lip 13. The lip 13 limits the forward movement of the cushion and the rear surface of the latter forms a suitable seat for the head of the pedal. Also, the side edges of the cushion may be slightly beveled, to give an outward taper to the body portion thereof, so that the edge of the lip has a progressively binding and clamping effect upon the cushion as the latter is pushed forwardly through the frame in the assembly of the parts of the pad,—such movement being limited by the seating of the flange on the concave rear surface of the frame.

The frame is of a construction adapting it to be struck or formed by means of dies from sheet metal of suitable gauge or thickness to afford the requisite stiffness and a relatively light weight can be employed by reason of the transverse rolling of the marginal ring supplemented by the indicated longitudinal curvature of the completed structure to conform to the pedal head which is housed in the portion of the rim 14 which projects rearwardly of the surface of the cushion, while carried by the frame and integral with and projecting from the rear edge of this rim is a series of pliable fastening ears 16 adapted to be folded inwardly into contact with the rear surface of the pedal head to secure the pad in place and lock the cushion in the frame.

Also formed integral with and projecting from the rear edge of the rim 14 is a side guard 17 consisting of a tongue which, extending laterally a short distance, as at 17$^a$, from the rim, is upturned abruptly to occupy a position substantially perpendicular to the general plane of the frame and terminates sufficiently in advance of the surface of the cushion to form an effective stop, to limit the lateral movement of the foot of the vehicle driver resting on the pad. Thus, not only is lateral slipping or displacement of the foot prevented, but the forwardly projecting end of the tongue serves as a reliable "finder" or means of enabling the driver, without special attention and without looking, to properly and instantly locate the pedal and position of his foot thereon. As indicated, the ribs or corrugations 18 of the cushion may be arranged to extend transversely of the pad to minimize tendency of the foot to slip longitudinally in the operation of the pedal, and thereby cooperate with the guard in giving the operator confidence of having a dependable purchase on the pedal.

I claim:

1. A pedal pad having a centrally open cushion-holding frame, adapted to receive a cushion therethrough and being attachable to a pedal, said frame being provided with a laterally off-set upstanding guard projecting beyond the surface of the cushion to form a "finder."

2. A pedal pad having a centrally open cushion-holding frame, adapted to receive a cushion therethrough and being attachable to a pedal, said frame being provided with a laterally off-set upstanding guard projecting beyond the surface of the cushion to form a "finder" and consisting of an integral extension of the frame.

3. A pedal pad having a centrally open cushion-holding frame consisting of a cross-sectionally rolled marginal ring forming a rearwardly directed pedal housing rim and provided with integral extensions constituting pedal engaging ears.

4. A pedal pad having a centrally open cushion-holding frame consisting of a cross-sectionally rolled marginal ring forming a rearwardly directed pedal housing rim and provided with integral extensions constituting pedal-engaging ears, and a forwardly directed guard off-set laterally from the frame.

5. A pedal pad having a centrally open marginal frame consisting of cross-sectionally rolled ring providing a concave rear seat defined by an inturned lip and a rearwardly directed rim, and a cushion fitted in the space bounded by and projecting forward beyond said lip and provided with a peripheral flange arranged in said seat.

6. A pedal pad having a centrally open marginal frame consisting of a cross-sectionally rolled ring providing a concave rear seat defined by an inturned lip and a rearwardly directed rim, and a cushion fitted in the space bounded by and projecting forward beyond said lip and provided with a peripheral flange arranged in said seat, the lip engaging portion of the cushion being forwardly tapered to bind therein.

7. A pedal pad having a centrally open marginal frame consisting of a cross-sectionally rolled ring providing a concave rear seat defined by an inturned lip and a rearwardly directed rim, and a cushion fitted in the space bounded by and projecting forward beyond said lip and provided with a peripheral flange arranged in said seat, said rim constituting a pedal head seat and having extensions forming pliable fastening ears.

DANIEL SINCLAIR.